F. G. ATTWOOD.
BEACON LIGHT.
APPLICATION FILED SEPT. 29, 1910.

1,015,532.

Patented Jan. 23, 1912.
6 SHEETS—SHEET 1.

F. G. ATTWOOD.
BEACON LIGHT.
APPLICATION FILED SEPT. 29, 1910.

1,015,532.

Patented Jan. 23, 1912.
6 SHEETS—SHEET 3.

Witnesses
M. E. Burrell
C. F. Early.

Inventor
Frederick George Attwood
By his Attorneys,
Bredwin & Wight

F. G. ATTWOOD.
BEACON LIGHT.
APPLICATION FILED SEPT. 29, 1910.

1,015,532.

Patented Jan. 23, 1912.
6 SHEETS—SHEET 4.

Witnesses
M. E. Burrell
O. F. Early

Inventor
Frederick George Attwood
By his Attorneys,
Baldwin Wight

F. G. ATTWOOD.
BEACON LIGHT.
APPLICATION FILED SEPT. 29, 1910.
1,015,532.
Patented Jan. 23, 1912.
6 SHEETS—SHEET 5.
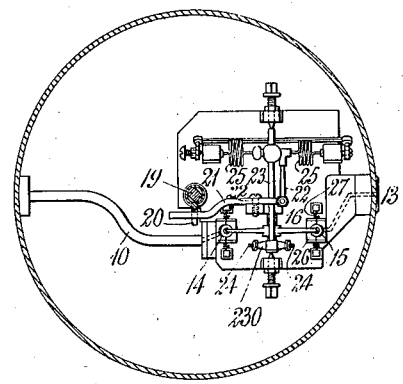
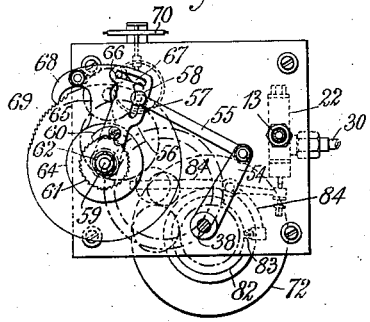
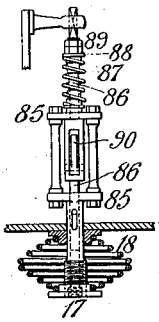
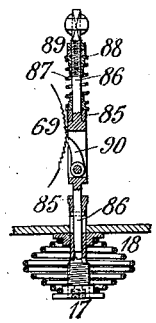
Witnesses
M. E. Burrell
C. F. Early
Inventor
Frederick George Attwood
By his Attorneys,
Baldwin Wight F. G. ATTWOOD.
BEACON LIGHT.
APPLICATION FILED SEPT. 29, 1910.
1,015,532.
Patented Jan. 23, 1912.
6 SHEETS—SHEET 6.
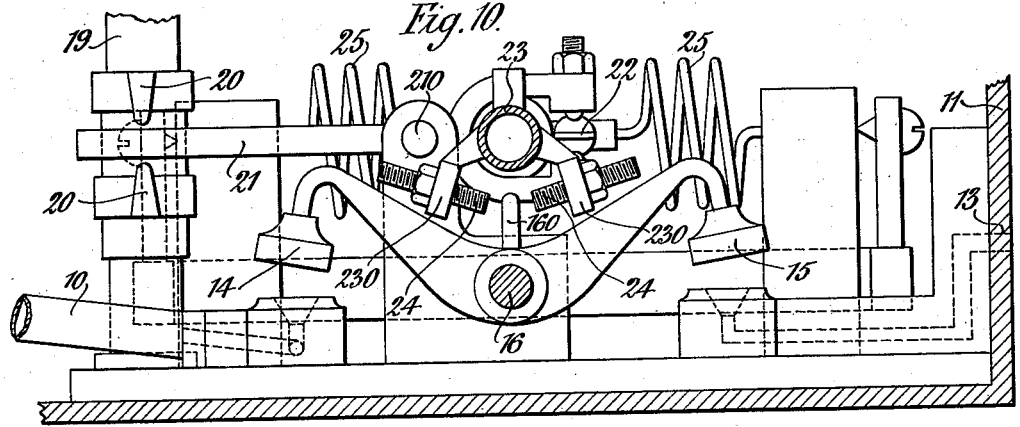
Fig. 10.
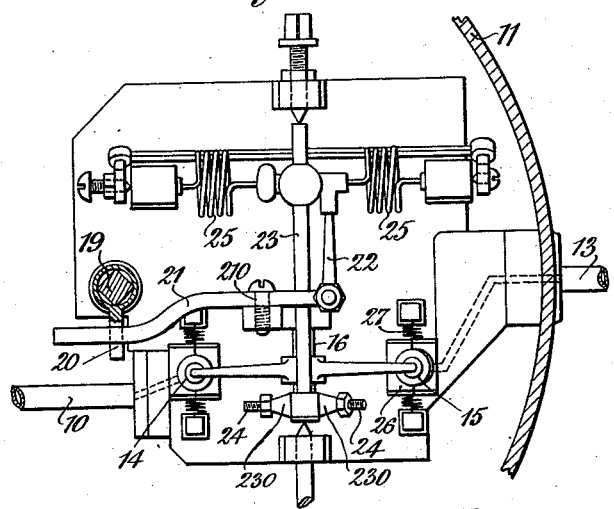
Fig. 11.
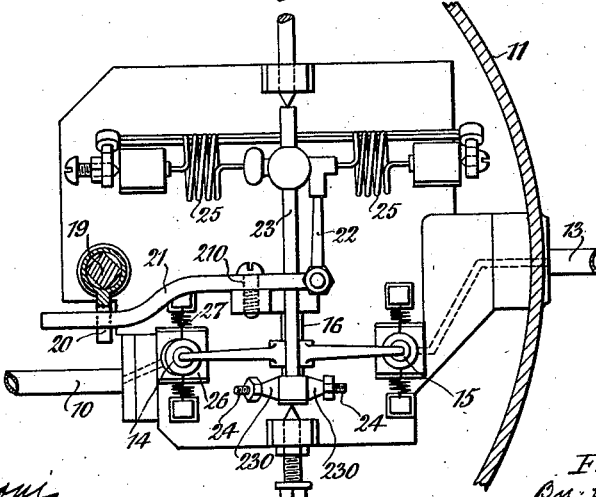
Witnesses.
E. B. Franzoni
M. E. Burrell
Inventor.
F. G. Attwood.
By his Attorneys
Baldwin & Wight

UNITED STATES PATENT OFFICE.

FREDERICK GEORGE ATTWOOD, OF LONDON, ENGLAND.

BEACON-LIGHT.

1,015,532.          Specification of Letters Patent.      Patented Jan. 23, 1912.

Application filed September 29, 1910. Serial No. 584,516.

*To all whom it may concern:*

Be it known that I, FREDERICK GEORGE ATTWOOD, a subject of the King of Great Britain, residing at 56 St. Stephen's road, Bow, London, England, have invented new and useful Beacon-Lights, of which the following is a specification.

This invention relates to apparatus to be used in lighthouses, light ships, beacons and the like, whereby the passage of gas or vapor from a reservoir to a burner is caused to rotate a lantern or lens and also to wind up a clock. For this purpose I pass the gas through a chamber in which is a movable wall, such as a diaphragm, which is moved first in one direction and then in the reverse direction. The movements of the diaphragm are transmitted as impulses to the lantern mechanism and to the clock and are also utilized to control the admission and escape of gas to and from the chamber which I will hereinafter call an "impulse chamber." I may use a pair of such impulse chambers to rotate the lantern and I may also interpose between the chamber or chambers and the lantern a clock train which is wound up by the chamber or chambers and itself drives the lantern. The clock first mentioned is used for turning on the full supply of gas to the burner at sunset and cutting it off at sunrise.

Figure 1:
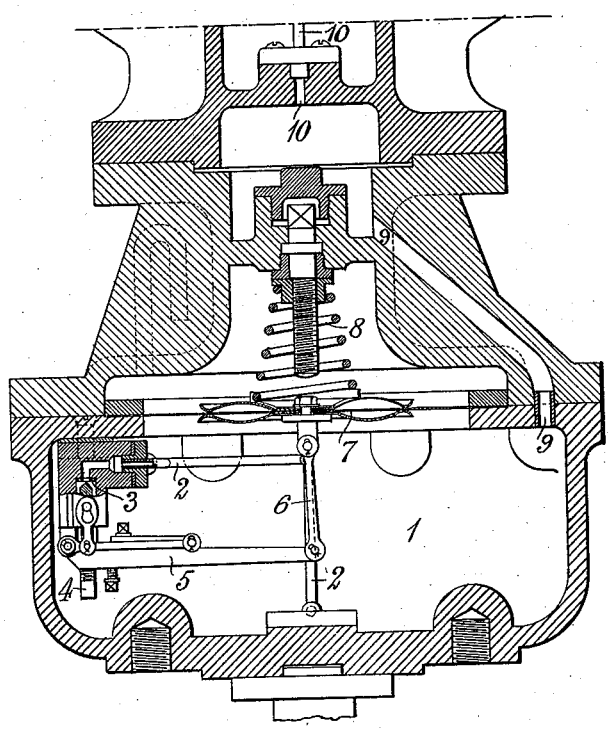
Figure 2:
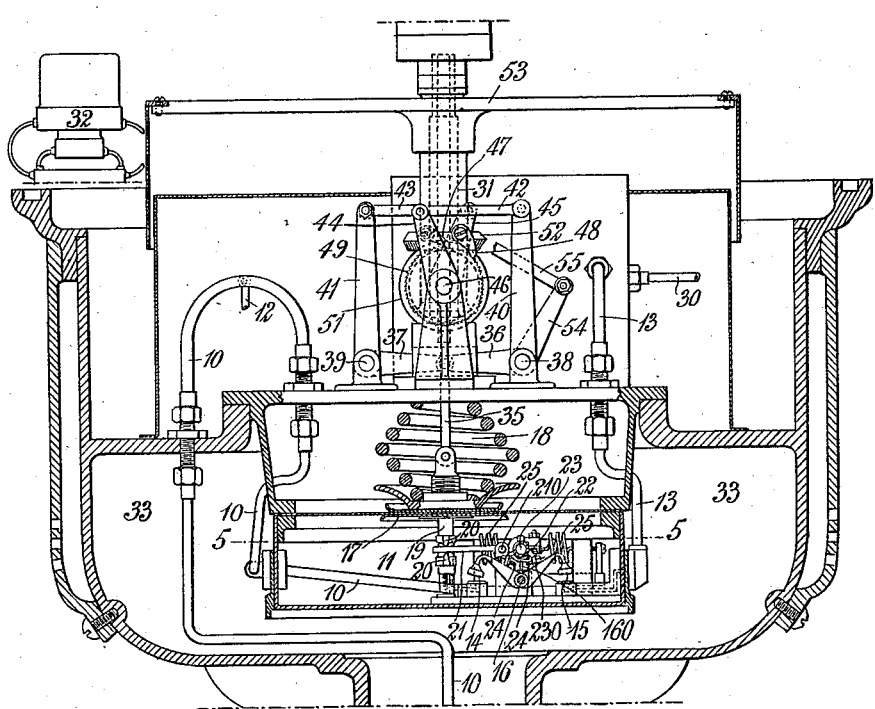
Figure 3:
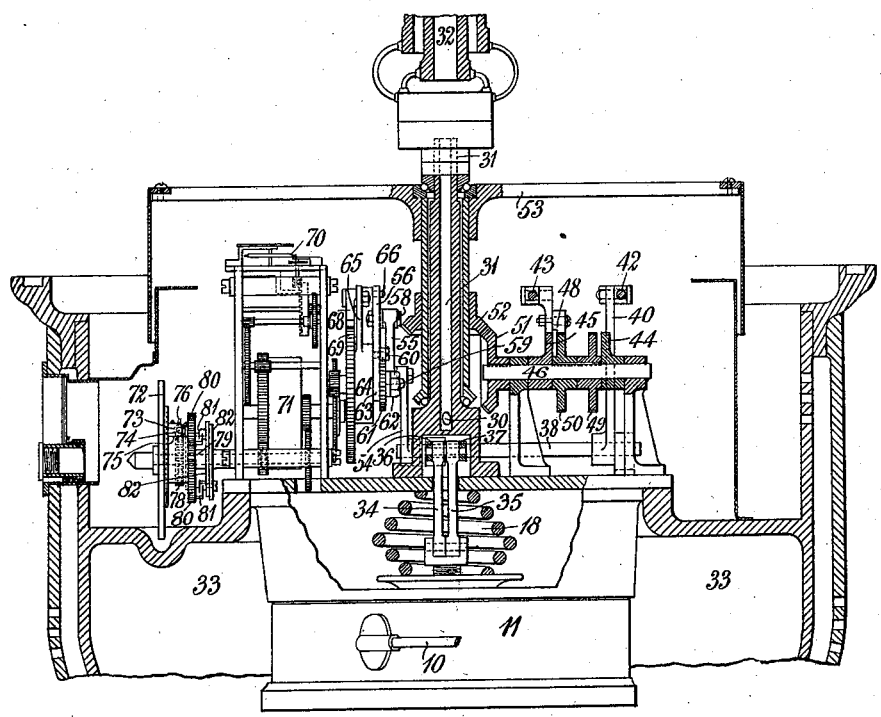
Figure 4:
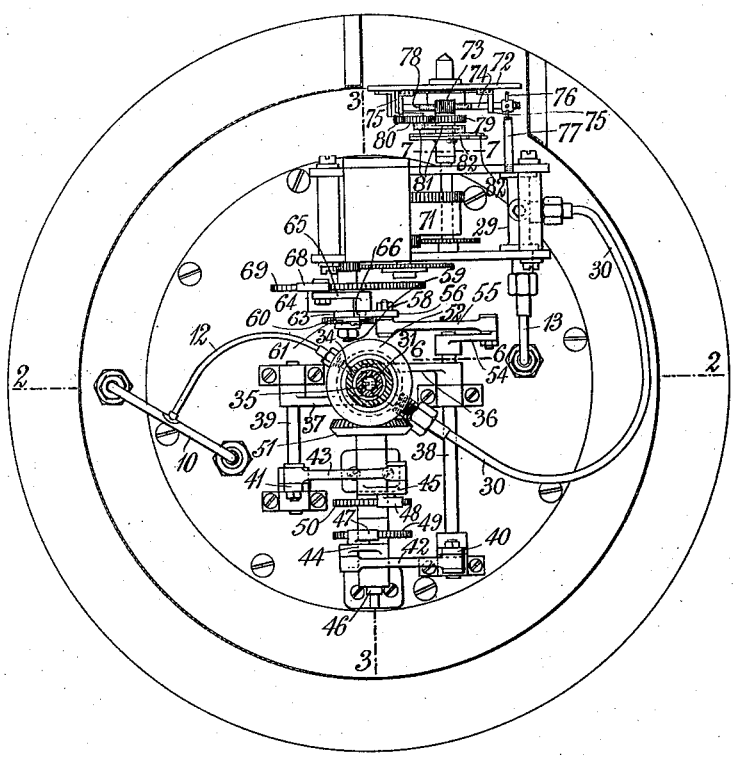

In the accompanying drawings:—Figure 1 is a vertical section of the lower part of an apparatus constructed according to this invention, and Figs. 2 and 3 are vertical sections on the lines 2—2 and 3—3, Fig. 4, at right angles to each other of the upper part. Fig. 4 is a plan of the upper part with the top of the casing removed. Fig. 5 is a local section on the line 5—5, Fig. 2. Figs. 6 and 7 are local sections on the lines 6—6 and 7—7, Fig. 4. Fig. 8 is a local side elevation and Fig. 9 a vertical section of a modification. Fig. 10 is an elevation on an enlarged scale of the inlet and outlet valve mechanism. Fig. 11 is a plan of another modification.

The lower part Fig. 1 consists of an apparatus such as is usually employed in gas buoys for reducing the pressure of the gas as it passes from the reservoir to the burner. 1 is a chamber connected to the reservoir (not shown) by the pipe 2 leading to the casing of the valve 3 past which the gas flows into the chamber by a pipe 4. The valve 3 is adjustably connected to the lever 5 the end of which is connected by the link 6 to the diaphragm 7 which forms the top of the chamber 1.

8 is an adjustable spring acting on the top of the diaphragm 7 and 9 is the outlet by which the gas passes from the chamber 1 on its way to the impulse chamber. The various parts are so adjusted that when the pressure in the chamber 1 exceeds the desired amount the diaphragm 7 rises closing the valve 3 and cutting off the supply of gas. As this part of the apparatus is of well known construction no further description of it is necessary. The outlet 9 is connected by a pipe 10 to the impulse chamber 11 (Figs. 2, 3 and 4) and 12 is a branch pipe leading to the constantly burning pilot light while 13 is a pipe by which the gas leaves the impulse chamber 11.

14 and 15 are valves (see particularly Figs. 2, 5 and 10) carried by arms fixed to the shaft 16 which is rocked in the manner hereinafter described. These valves work against valve seats at the ends of the pipes 10 and 13 and move together in such a manner that when the valve 14 is on its seat and thus preventing the entrance of gas into the chamber 11, the valve 15 is raised allowing the gas to pass from the chamber to the burner and when the valve 14 is raised to admit gas the valve 15 is upon its seat and stops the flow of gas to the burner. In this way a pulsating or flash light is obtained.

The drawings show the valves midway of their travel but as will now be explained they cannot remain in this position. The mechanism for operating the valves 14 and 15 is as follows:—The top of the impulse chamber 11 consists of a flexible diaphragm 17 pressed downward by a spring 18. 19 is a rod fixed to the diaphragm 17 and carrying two arms 20, 20 which embrace a lever 21 pivoted at 210. The tail end of the lever 21 is forked and embraces an arm 22 fixed to a rocking shaft 23 to which is fixed a fork 230 carrying adjustable pins 24 adapted to strike against a lug 160 fixed to the rocking shaft 16. 25 are springs in compression bearing against lugs on the shaft 23. It will be seen from this construction that when the movement of the diaphragm 17 and lever 21 have turned the rocking shaft 23 just past its mid-position the expansion of the springs 25 causes it suddenly to complete its movement independently of the lever 21 thus causing one or other of the pins 24 to strike against the lug 160 and smartly close one or other of the valves 14 and 15. 26 are jaws acted on by springs 27; the valves in closing pass between these jaws which hold them in their closed positions. The gas passing out of the impulse chamber 11 through the outlet valve 15 is led by the pipe 13 to a valve 29 (see Figs. 4 and 6) and from thence by a pipe 30 and hollow fixed pillar 31 to the burner 32. If a steady light is desired in place of a pulsating or flash light it is only necessary to omit the lower part of the pipe 13 so as to allow the gas escaping from the valve 15 to enter and expand in the chamber 33 surrounding the chamber 11, the pipe 13 then becoming the outlet from that chamber 33.

34 and 35 are links pivoted to the top of the diaphragm 17 and to arms 36 and 37 fixed to rocking shafts 38 and 39. 40 and 41 are other arms fast on these shafts and connected by links 42 and 43 to the upper ends of levers 44 and 45 free to turn on a shaft 46 and having pivoted to them pawls 47 and 48 engaging with ratchet wheels 49 and 50 fast on a shaft 46. When the diaphragm 17 is rising the levers 44 and 45 move toward each other and the pawl 47 drives the ratchet wheel 49 while the pawl 48 rides over the teeth of the ratchet wheel 50 but when the diaphragm 17 is descending the pawl 48 drives the wheel 50 and the pawl 47 rides over the teeth of the wheel 49. In this manner the shaft 46 is driven more or less continuously so long as gas is passing to the burner.

When using a steady light and not a flash light I prefer to employ two impulse chambers 11 placed side by side as shown in Fig. 11 and I then prolong the shaft 23 into the second chamber 11 where it carries another pair of pins 24 which actuate another pair of valves 14 and 15 precisely similar to but placed oppositely to those in the first chamber so that when the valve 14 in the first chamber is open and the valve 15 closed, valve 14 in the second chamber is closed and valve 15 open and vice versa so that there is a steady flow of gas to the burner. The two diaphragms may be connected to a rocking beam similar to that of a beam engine such beam being caused to rotate the lantern. The shaft 46 has fixed to it a bevel wheel 51 gearing with a bevel wheel 52 fast with a table 53 which is free to turn on the pillar 31 and on which the lantern (not shown) is carried.

54 is an arm fast on the rocking shaft 38 and connected by a link 55 to a lever 56 (see Fig. 6) the pivot of the link to the lever being adjustably fixed in a slot 57 by means of a nut 58. The lever 56 is free to turn on a spindle 59 and has pivoted to it a pawl 60 engaging with a ratchet wheel 61 fixed by a nut 62 to a sleeve 63 free to turn on the spindle 59. 64 is a spring box also free to turn on the spindle 59 and having fixed inside it the outer end of a coiled spring the inner end of which is fixed to the sleeve 63.

65 is a lever fixed to the spring box 64 and having fixed to it a pin 66 working in a second slot 67 in the lever 56.

68 is a pawl pivoted on the lever 65 and engaging with a ratchet wheel 69 which forms part of a clock train. The strength of the spring in the spring box 64 can be adjusted by loosening the nut 62 and then turning the sleeve 63 relatively to the ratchet wheel 61.

The action of the apparatus is as follows:—When the diaphragm 17 is descending, the arm 54 is turned from right to left Fig. 6, and the lever 56 and ratchet wheel 61 are turned by it in the same direction. If the clock is not fully wound the spring in the box 64 is sufficiently strong to cause the turning of the ratchet wheel 61 to carry the box 64 and lever 65 around with it thus turning the ratchet wheel 69 and winding up the clock but when the clock is fully wound, the resistance of the ratchet wheel 69 is too great to be overcome by the spring in the box 64 and the box therefore remains stationary and the lever 56 simply oscillates to and fro without moving the lever 65 or further winding up the clock the slot 67 in which the pin 66 lies allowing of this movement.

70 is the balance wheel of the clock and 71 is its spring barrel. The clock train is of ordinary construction and as it is clearly shown in the drawings it requires no description.

72 is a disk driven by the clock train and making one revolution a day.

73 is a worm fixed to a spindle 74 turning in bearings 75 fixed to the disk 72 and 76 is a star wheel fixed to the spindle 74. As the disk 72 revolves it carries the spindle 74 and wheel 76 with it and once in every revolution one of the pins of the wheel 76 comes against a stop 77 fixed to the frame of the apparatus so that the wheel 76 and worm 73 are given one seventh of a turn once a day and therefore a complete turn once a week. The worm 73 gears with a worm wheel 78 having fifty-two teeth so that the worm wheel revolves once a year. The worm wheel 78 has fixed to it a toothed wheel 79 gearing with two toothed wheels 80 turning in bearings on the disk 72.

81 are links connecting the wheels 80 to the two halves 82, 82 of a disk cam. It will be seen that the arrangement is such that as the worm wheel 78 revolves the halves 82 are turned in opposite directions and the length therefor of the rise of the cam is varied from day to day.

83 (Fig. 6) is a roller bearing on the cam 82 and carried by a counterbalanced lever 84 by which the gas valve 29 is operated. The cams 82 are so proportioned and set that the valve 29 is opened and gas supplied to the burner as near as may be at sunset and the valve is closed and gas is turned off as near as may be at sunrise. The pilot light supplied by the pipe 12 is always burning.

In cases where it is not desired to rotate the lantern the mechanism for winding the clock can be simplified and placed axially in the apparatus. This arrangement is shown by Figs. 8 and 9. In these figures 17 is as before the diaphragm forming the top of the impulse chamber, 18 is the spring acting upon it and 69 is the ratchet wheel in the clock train. 85 is a frame fixed to the top of the diaphragm 17 and 86 is a rod free to move longitudinally in the frame. 87 is a spring interposed between the top of the frame 85 and a collar 88 fixed to the rod 86. The strength of the spring 87 can be adjusted by means of nuts 89. 90 is a pawl pivoted to the spindle 86 and gearing with the ratchet wheel 69.

The action is as follows:—As the diaphragm 17 rises it carries the frame 85, spring 87, rod 86 and pawl 90 with it and winds up the clock but when the clock is fully wound the resistance of the ratchet wheel 69 is too great to be overcome by the spring 87 and the rod 86 and pawl 90 then remain stationary and the upward movement of the frame 85 simply compresses the spring 87.

What I claim is:—

1. The combination of a pressure reducing chamber to which high pressure gas is admitted, an impulse chamber receiving gas at a constant low pressure from the pressure reducing chamber and which impulse chamber is provided with a movable wall, inlet and outlet valves for the impulse chamber, connections between said valves and the movable wall whereby as the latter is vibrated the former are alternately opened and closed, a burner supplied with gas from the impulse chamber, a valve for turning on and shutting off the supply of gas to the burner, means for periodically operating said valve to open and close communication between the impulse chamber and the burner, a clock train for operating said valve-operating means, and connections between the movable wall of the impulse chamber and the clock train for winding the latter and keeping it always wound.

2. The combination with a pressure reducing chamber to which high pressure gas is admitted, an impulse chamber receiving gas at a constant low pressure from the pressure reducing chamber and which impulse chamber is provided with a movable wall, inlet and outlet valves for the impulse chamber, connections between said valves and the movable wall whereby as the latter is vibrated the former are alternately opened and closed, a burner supplied from the impulse chamber, a valve for turning on and shutting off the supply of gas to the burner, means for periodically operating said valve to open and close communication between the burner and the impulse chamber, a clock train for operating said valve-operating means, connections between the movable wall of the impulse chamber and the clock train for winding the latter, and devices for automatically varying the time of opening and closing the valve between the burner and the impulse chamber.

3. The combination of a pressure reducing chamber to which high pressure gas is admitted, an impulse chamber receiving gas at a constant low pressure from the pressure reducing chamber and which impulse chamber is provided with a movable wall, inlet and outlet valves for the impulse chamber, connections between said valves and the movable wall whereby as the latter is vibrated the former are alternately opened and closed, a burner supplied with gas from the impulse chamber, a lantern, connections between the movable wall and the lantern for operating the latter, a valve for turning on and shutting off the supply of gas to the burner, and mechanism operated by the movable wall of the impulse chamber for actuating said valve.

FREDERICK GEORGE ATTWOOD.

Witnesses:
  FREDERICK GEORGE ATTWOOD, Junr.,
  HERBERT D. JAMESON.